United States Patent
Estella Aguerri et al.

(10) Patent No.: US 11,096,088 B2
(45) Date of Patent: Aug. 17, 2021

(54) RADIO FREQUENCY SIGNAL RECEIVING DEVICE AND SIGNAL PROCESSING DEVICE

(71) Applicant: HUAWEI TECHNOLOGIES CO., LTD., Guangdong (CN)

(72) Inventors: Inaki Estella Aguerri, Boulogne Billancourt (FR); Meryem Benammar, Munich (DE); Abdellatif Zaidi, Boulogne Billancourt (FR)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/413,489

(22) Filed: May 15, 2019

(65) Prior Publication Data
US 2019/0268804 A1  Aug. 29, 2019

Related U.S. Application Data

(63) Continuation of application No. PCT/EP2016/077923, filed on Nov. 17, 2016.

(51) Int. Cl.
*H04W 28/06* (2009.01)
*H04B 7/0456* (2017.01)
(Continued)

(52) U.S. Cl.
CPC ............ *H04W 28/06* (2013.01); *H04B 7/024* (2013.01); *H04B 7/0456* (2013.01); *H04B 7/0617* (2013.01); *H04B 7/0626* (2013.01)

(58) Field of Classification Search
CPC ..... H04W 28/06; H04B 7/024; H04B 7/0456; H04B 7/0617; H04B 7/0626
See application file for complete search history.

(56) References Cited

U.S. PATENT DOCUMENTS 6,680,921 B1 * 1/2004 Svanbro .................. H03M 7/30
370/324
8,418,037 B2 * 4/2013 Li ........................... H04L 69/04
714/776
(Continued)

FOREIGN PATENT DOCUMENTS

CN          104144529 A     11/2014
WO     WO-2014059936 A1 *  4/2014    ............. H04B 7/024

OTHER PUBLICATIONS

XP011609979 Seok-Hwan Park et al.,"Multihop Backhaul Compression for the Uplink of Cloud Radio Access Networks",IEEE Transactions on Vehicular Technology ( vol. 65 , Issue: 5 , May 2016 ),total 15 pages.
XP055392961 Antonio Puglielli et al.,"A scalable massive Mimo array architecture based on common modules",2015 IEEE International Conference on Communication Workshop (ICCW),total 6 pages.

(Continued)

*Primary Examiner* — Jay P Patel
(74) *Attorney, Agent, or Firm* — Womble Bond Dickinson (US) LLP

(57) ABSTRACT

The present disclosure relates to reception of radio frequency (RF) signals from one or more user communication devices at N RF signal receiving devices, wherein N is a positive integer, and to processing of the received RF signals by the one or more RF signal receiving devices. A RF signal receiving device decompresses compressed output signals received from one or more RF signal receiving devices of the N RF signal receiving devices and generates a compressed output signal by executing a signal compression with regard to the decompressed signals and with regard to a RF signal received by the RF signal receiving device. Additionally, the present disclosure is directed to a further processing of output signals of a RF signal receiving device of the N RF signal receiving devices at a signal processing device.

19 Claims, 12 Drawing Sheets

(51) Int. Cl.
*H04B 7/06* (2006.01)
*H04B 7/024* (2017.01)

(56) References Cited

U.S. PATENT DOCUMENTS

| | | | |
|---|---|---|---|
| 9,118,446 B2 | 8/2015 | Hu et al. | |
| 2007/0285371 A1* | 12/2007 | Nam | G06F 3/1462 345/98 |
| 2010/0205497 A1* | 8/2010 | Li | H04L 69/04 714/746 |
| 2012/0230386 A1* | 9/2012 | Chen | H04L 25/0232 375/234 |
| 2013/0170372 A1 | 7/2013 | Zhang et al. | |
| 2013/0201912 A1* | 8/2013 | Sheng | H04B 7/0634 370/328 |
| 2014/0169263 A1 | 6/2014 | Stapleton | |
| 2015/0078490 A1* | 3/2015 | Hu | H04W 24/02 375/341 |
| 2017/0034733 A1* | 2/2017 | Sun | H04L 43/12 |
| 2017/0117996 A1* | 4/2017 | Lorca Hernando | H04L 5/0073 |
| 2017/0272134 A1* | 9/2017 | Yuan | H04W 52/325 |
| 2018/0019908 A1* | 1/2018 | Ding | H04L 69/22 |
| 2018/0310230 A1* | 10/2018 | Niu | H04W 48/12 |
| 2018/0323858 A1* | 11/2018 | Bergstrom | H04B 7/0857 |

OTHER PUBLICATIONS

A. Vosoughi, M. Wu, and J. R. Cavallaro, "Baseband signal compression in wireless base stations," in Global Communications Conference (GLOBECOM), 2012 IEEE, Dec. 2012, pp. 4505-4511.
B. Guo, W. Cao, A. Tao, and D. Samardzija, "CPRI compression transport for LTE and LTE-A signal in C-RAN," in Communications and Networking in China (CHINACOM), 2012 7th International ICST Conference on, Aug. 2012, pp. 843-849.
S. Nanba and A. Agata, "A new IQ data compression scheme for front-haul link in Centralized RAN," in Personal, Indoor and Mobile Radio Communications (PIMRC Workshops), 2013 IEEE 24th International Symposium on, Sep. 2013, pp. 210-214.
K. F. Nieman and B. L. Evans, "Time-domain compression of complex-baseband LTE signals for cloud radio access networks," in Global Conference on Signal and Information Processing (GlobalSIP), 2013 IEEE, Dec. 2013, pp. 1198-1201.
J. Lorca and L. Cucala, "Lossless compression technique for the fronthaul of LTE/LTE-advanced cloud-RAN architectures," in World of Wireless, Mobile and Multimedia Networks (WoWMoM), 2013 IEEE 14th International Symposium and Workshops on a, Jun. 2013, pp. 1-9.
A. E. Gamal and Y.-H. Kim, Network Information Theory. Cambridge University Press, 2011.,total 202 pages.

\* cited by examiner

RADIO FREQUENCY SIGNAL RECEIVING DEVICE AND SIGNAL PROCESSING DEVICE

CROSS-REFERENCE TO RELATED APPLICATIONS

This application is a continuation of International Application No. PCT/EP2016/077923, filed on Nov. 17, 2016, the disclosure of which is hereby incorporated by reference in its entirety.

TECHNICAL FIELD

The present disclosure is directed to reception of radio frequency (RF) signals from one or more user communication devices at one or more RF signal receiving devices and to processing of the received RF signals by the one or more RF signal receiving devices. Additionally, the present disclosure is directed to a further processing of output signals of a RF signal receiving device at a signal processing device.

BACKGROUND

Massive multiple input multiple output (M-MIMO) systems operation over large bandwidths is considered to be one of the most promising technologies to increase the spectral efficiency in next-generation cellular systems. The implementation of base stations for this technology in challenging, and many architectures have been proposed for it.

The most popular implementation for M-MIMO stations relies on a distributed architecture, in which the base station baseband (BB) processing and the radio processing are carried out by separate units, the base band unit (BBU) and one or more radio resource units (RRUs), which are generally remotely located. Thus, for example, in the uplink, a RRU applies radio frequency processing and analog to digital processing (ADC) operations to obtain a digitized version of the received signal, while a BBU is in charge of the baseband processing functionalities of the phase and quadrature (I/Q) samples obtained by the RRU, such as the frequency domain functionalities (e.g., inverse fast Fourier transformation (IFFT), cyclic prefix addition for orthogonal frequency-division multiplexing (OFDM) waveforms, etc.), receive filtering and/or bit level decoding. Any one of the multiple remote RRUs is formed, for example, by a block of one or more antennas. The one or more remote RRUs are connected through dedicated fronthaul (FH) links to the BBU, which transmits I/Q samples between the units. This arrangement is exemplary shown in FIG. 1.

In FIG. 1, N RRUs 110_1, . . . , 110_n, . . . , 110_N are shown exemplary, wherein N is a positive integer and wherein n is a positive integer that is less than or equal to N. Any one of the N RRUs 110_1, . . . , 110_n, . . . , 110_N comprises one or more antennas 111, receives RF signals via the respective antennas 111, and executes radio frequency processing and ADC operations to obtain digitized versions of the received RF signals. Any one of the N RRUs 110_1, . . . , 110_n, . . . , 110_N is connected with the BBU 120 via a fronthaul (FH) link 130. The BBU 120 receives from the RRUs 110_1, . . . , 110_n, . . . , 110_N the digitized versions of the received RF signals and executes corresponding processing operations on the digitized versions of the received RF signals. In FIG. 1 the BBU 120 exemplary comprises one or more BB processing entities 121, executing digital BB processing per antenna 111, one or more beamforming entities 122, executing beamforming of the received digitized versions of the received RF signals, and one or more further processing entities 123, executing coding, mapping and/or further functions on the digitized versions of the received RF signals per user. Due to the large number of antennas 111 and bandwidth of the system, the volume of I/Q samples to communicate between the RRU nodes 110_1, . . . , 110_n, . . . , 110_N and the central BBU 120 becomes prohibitive. Common packet radio interface (CPRI) compression techniques prior to transmission on the FH 130 are critical and are applied to reduce the FH 130 requirements. Additionally the use of dedicated FH links 130 to connect each RRU unit 110_1, . . . , 110_n, . . . , 110_N in centralized MIMO receivers results in hardware limitation if additional antennas 111 have to be added to the system.

The chained MIMO architecture (C-MIMO) has been proposed (see FIG. 2) to overcome these limitations, in which the antennas 111 are grouped in receiving nodes 210_1, 210_2, . . . , 210_N with RRU functionalities, which are concatenated in chains (or meshes) sharing a common bus or FH link connecting (see arrow 130 in FIG. 2) the RRU nodes 210_1, 210_2, 210_N with a centralized unit 220 with the BBU functionalities or with BBU 220 respectively. This significantly reduces the FH 130 requirements and provides modularity to add additional antenna 111 blocks or RRUs 210_1, 210_2, . . . , 210_N to the system if required. Additionally, in C-MIMO some BBU functionalities are moved to the RRU nodes 210_1, 210_2, . . . , 210_N, such as the frequency functionalities and most of the processing is directly applied in the frequency domain.

In the C-MIMO architecture, as exemplary shown in FIG. 2, the beamforming filtering, which is traditionally executed in a centralized manner, i.e. at the BBU 120, 220, can be performed also in a distributed manner, i.e. at the one or more RRUs 210_1, 210_2, . . . , 210_N. This may depend on the channel state information (CSI) and delay requirements.

Despite the reduction of FH 130 requirements in C-MIMO, the volume of data to be transmitted over the common FH 130 is still large and compression of the I/Q is required.

In some standard CPRI (common public radio interface) compression solutions for centralized MIMO architectures in C-MIMO receivers, any one of the RRUs 210_1, 210_2, . . . , 210_N has available a fraction of CPRI bits for sending its compression bits to the BBU 220, and any one of the RRUs 210_1, 210_2, . . . , 210_N compresses its received signal independently of the signals received at the other RRUs 210_1, 210_2, . . . , 210_N. While this solution has a low delay and complexity, it has severe limitations. Mainly, since the CPRI link 130 from the RRUs 210_1, 210_2, . . . , 210_N to the BBU 220 is shared, the more RRUs 210_1, 210_2, . . . , 210_N are in the chain, the higher is the demand in terms of CPRI throughput.

Thus, further solutions for effectively transmitting data from the one or more RRUs to the BBU 220 are required.

SUMMARY

The object of the present disclosure is improving the uplink transmission in a communication network using one or more RF signal receiving nodes such as RRUs and a central node such as BBU, i.e. improving the transmission of data from user communication devices towards the communication network. Particularly, the improvement of the transmission of data from one or more receiving nodes (e.g., RRUs) to a central node (e.g., BBU) is desired in view of the aforesaid.

The object of the present disclosure is achieved by the solution provided in the enclosed independent claims. Advantageous implementations of the present disclosure are further defined in the respective dependent claims, in the description, and/or in the appended figures.

In particular, the disclosure, described herein, relates to the field of cloud communications over distributed nodes, such as RRUs and BBU, connected through fronthaul (FH) links and allows to decrease communication requirements between a chain of concatenated receiving (multi-antenna) nodes such as RRUs for the reconstruction of the received signals at the nodes (or a function of them) at the last receiving node, the central unit or BBU, at a certain quality.

By including a decompression block followed by a joint compression block at each receiving node (e.g., RRU), as described herein, the present disclosure allows a reduction of communication rate requirements between the receiving nodes and the central unit, by exploiting the correlation between the signals received at the previous nodes, without compromising the quality of a received signal reconstructed at the central unit between a plurality of transmitters and a multi-antenna chained MIMO receiver. Further, the present disclosure allows an improved quality of a received signal reconstructed at the central unit between a plurality of transmitters and a multi-antenna chained MIMO receiver for a given available fronthaul throughput. The processing is done at the decompression and joint compression block on each node. Further, the processing is done in dependency on available channel state information, as well as on delay requirements of the system.

The present disclosure uses the chained structure of the arrangement of the receiving nodes such as RRUs (e.g., implemented in a C-MIMO architecture) and uses the receiving nodes such as RRUs for reducing communication between the receiving nodes such as RRUs and the central unit such as BBU.

Further, according to the present disclosure, an I/Q compression solution is presented that is designed for C-MIMO systems to significantly decrease the FH throughput requirements while guaranteeing a low distortion (EVM) between the transmitted user signals and the reconstruction of them at the destination unit. The proposed solution is based on the addition of a decompression action/operation followed by joint recompression at each receiving node such as RRU node in such a way that the correlation between the signals from the previous receiving nodes such as RRU nodes can be exploited to reduce the FH requirements. The decompression and joint compression operations are performed differently depending on the different requirements in terms of CSI and delay. The proposed disclosure shows significant compression gains with respect to known standard CPRI compression techniques.

According to one embodiment, a radio frequency, RF, signal receiving device is provided that is configured to receive RF signals from K user communication devices, wherein K is a positive integer, and wherein said RF signal receiving device comprises: a decompression entity configured to generate n−1 decompressed signals by decompressing n−1 compressed output signals, received from n−1 further RF signal receiving devices of an arrangement of N RF signal receiving devices, wherein N is a positive integer and wherein n is a positive integer that is less than or equal to N−1; a compression entity configured to generate a compressed output signal by executing a signal compression with regard to the n−1 decompressed signals and with regard to a RF signal received by the RF signal receiving device.

In one embodiment, the RF signal receiving device comprises one or more antennas configured to receive the RF signals from the K user communication devices.

In one embodiment, the compression entity is configured to execute the signal compression by using a vector coding method.

In one embodiment, said RF signal receiving device further comprises a processing entity configured to execute a signal processing with regard to the n−1 decompressed signals and with regard to the received RF signal before the compression of the n−1 decompressed signals and the received RF signal by the compression entity.

In one embodiment, the signal processing, executed by the processing entity, comprises a generation of an innovation signal by executing an innovation computation with regard to the n−1 decompressed signals and with regard to the received RF signal; and the compression entity is configured to: execute the signal compression by compressing the innovation signal, and output the compressed innovation signal as the compressed output signal.

In one embodiment, the signal processing, executed by the processing entity, comprises a generation of an estimation signal of an estimation of a function of N RF signals, received at the N RF signal receiving devices, with regard to the n−1 decompressed signals and with regard to the received RF signal; and the compression entity is configured to execute the signal compression by compressing the estimation signal and to output the compressed estimation signal as the compressed output signal.

In one embodiment, the estimation signal is a distributed beamforming estimation signal and wherein the generation of the estimation signal comprises a generation of the distributed beamforming estimation signal or a partial estimation function of the distributed beamforming estimation as the distributed beamforming estimation signal by executing a beamforming estimation with regard to the n−1 decompressed signals and with regard to the received RF signal.

In one embodiment, the beamforming estimation is executed with regard to a beamformed received RF signal and wherein any one of the n−1 decompressed signals is a beamformed signal.

In one embodiment, the RF signal receiving device comprises a beamforming entity configured to execute a beamforming with regard to the received RF signal.

In one embodiment, the beamforming is executed by using a distributed beamformer filter.

In one embodiment, the distributed beamformer filter is determined by the RF signal receiving device or an information on the distributed beamformer filter to be used is received by the RF signal receiving device from a signal processing device.

In one embodiment, the RF signal receiving device is configured to output the compressed output signal.

In one embodiment, the RF signal receiving device is configured to provide the compressed output signal to at least one further RF signal receiving device of the arrangement of N RF signal receiving devices or to a signal processing device.

In one embodiment, the RF signal receiving device is configured to provide the compressed output signal to the at least one further RF signal receiving device of the arrangement of N RF signal receiving devices or to the signal processing device via a fronthaul connection between the RF signal receiving device and the at least one further RF signal receiving device of the arrangement of N RF signal receiving devices or via a fronthaul connection between the RF signal receiving device and the signal processing device.

In one embodiment, the RF signal receiving device is a radio resource unit.

In one embodiment, each one RF signal receiving device of the arrangement of N RF signal receiving devices is a RF signal receiving device according to any one of the preceding claims.

In one embodiment, the N RF signal receiving devices of the arrangement of N RF are arranged in a chain.

In one embodiment, the decompressing of the n−1 compressed output signals is executed depending on parameters, conditions and/or characteristics of a first link, via which the n−1 compressed output signals have been received; the signal compression is executed depending on parameters, conditions and/or characteristics of a second link, to which the compressed output signal will be output; and/or the parameters, conditions and/or characteristics comprise a capacity of the respective link, channel state information, CSI, delay requirements, and/or common public radio interface, CPRI, bandwidth.

According to one embodiment, a method is provided that is arranged for execution by a radio frequency, RF, signal receiving device, which is configured to receive RF signals from K user communication devices, wherein K is a positive integer, and wherein the method comprises: generating n−1 decompressed signals by decompressing n−1 compressed output signals, received from n−1 further RF signal receiving devices of an arrangement of N RF signal receiving devices, wherein N is a positive integer and wherein n is a positive integer that is less than or equal to N−1; generating a compressed output signal by executing a signal compression with regard to the n−1 decompressed signals and with regard to a RF signal received by the RF signal receiving device. The method is executed by the RF signal receiving device as introduced above and/or as described in more detail below. Thus, the method comprises any one of the actions, operations, or blocks executed by the RF signal receiving device.

According to one embodiment, an arrangement of N RF signal receiving devices is provided, wherein N is a positive integer and wherein each RF signal receiving device of the arrangement of N RF signal receiving devices is a RF signal receiving device as introduced above and/or as described below in more detail.

According to one embodiment, a signal processing device is provided, wherein the signal processing device comprises: a receiving entity configured to receive a compressed output signal from a radio frequency, RF, signal receiving device of an arrangement of N RF signal receiving devices, wherein each RF signal receiving device of the arrangement of N RF signal receiving devices is a RF signal receiving device, as introduced above and/or as explained in more detail below, and wherein N is a positive integer; and a signal reconstruction entity configured to execute a signal reconstruction by use of the received compressed output signal.

In one embodiment, the signal reconstruction results in reconstructed RF signals received at the N RF signal receiving devices of the arrangement of N RF signal receiving devices.

In one embodiment, the signal reconstruction entity is configured to execute the signal reconstruction by: computing a centralized beamforming filter; and generating an estimation of a function of RF signals received at the N RF signal receiving devices of the arrangement of N RF signal receiving devices, wherein the estimation is executed by applying the centralized beamforming filter to the received compressed output signal.

In one embodiment, the signal reconstruction entity is configured to execute the signal reconstruction by: decompressing the received compressed output signal; and executing the signal reconstruction with regard to the decompressed signal received by the decompressing of the received compressed output signal.

In one embodiment, the receiving entity is configured to receive the compressed output signal from the RF signal receiving device via a fronthaul connection between the RF signal receiving device and the signal processing device.

In one embodiment, the signal processing device is a base band unit.

According to one embodiment, a signal processing method is provided that comprises: receiving a compressed output signal from a radio frequency, RF, signal receiving device of an arrangement of N RF signal receiving devices, wherein each RF signal receiving device of the arrangement of N RF signal receiving devices is a RF signal receiving device, as introduced above and/or as explained in more detail below, and wherein N is a positive integer; and executing a signal reconstruction by use of the received compressed output signal. The method is executed by the signal processing device as introduced above and/or as described in more detail below. Thus, the method comprises any one of the actions, operations, or blocks executed by the signal processing device.

According to one embodiment, a system is provided that comprises one or more radio frequency, RF, signal receiving devices, wherein any one of the FR signal receiving devices is a RF signal receiving device, as introduced above and/or as explained in more detail below, and a signal processing device, as introduced above and/or as explained in more detail below.

According to one embodiment, a base station, BS, receiver is provided that comprises one or more radio frequency, RF, signal receiving devices, wherein any one of the FR signal receiving devices is a RF signal receiving device, as introduced above and/or as explained in more detail below, and a signal processing device, as introduced above and/or as explained in more detail below.

In one embodiment, the BS receiver is a chained multiple input multiple output (MIMO) BS receiver.

BRIEF DESCRIPTION OF DRAWINGS

The embodiments disclosed in the present disclosure will be explained in the following description of specific embodiments in relation to the enclosed drawings.

DETAILED DESCRIPTION OF EMBODIMENTS

Generally, it has to be noted that all arrangements, devices, modules, components, models, elements, units, entities, and means and so forth described in the present disclosure could be implemented by software or hardware elements or any kind of combination thereof. All actions, operations, or blocks which are performed by the various entities described in the present disclosure as well as the functionality described to be performed by the various entities are intended to mean that the respective entity is adapted to or configured to perform the respective actions, operations, blocks, and functionalities. Even if in the following description of the specific embodiments, a specific functionality, action, operation, or block to be performed by a general entity is not reflected in the description of a specific detailed element of the entity which performs the specific action, operation, block, or functionality, it should be clear for a skilled person that these methods and functionalities can be implemented in respective hardware or software elements, or any kind of combination thereof. Further, the method of the present disclosure and its various actions, operations, functions, blocks, etc., are embodied in the functionalities of the various described apparatus elements.

Moreover, any of the embodiments and features of any of the embodiments, described herein, may be combined with each other, unless a combination is explicitly excluded.

Figure 1:
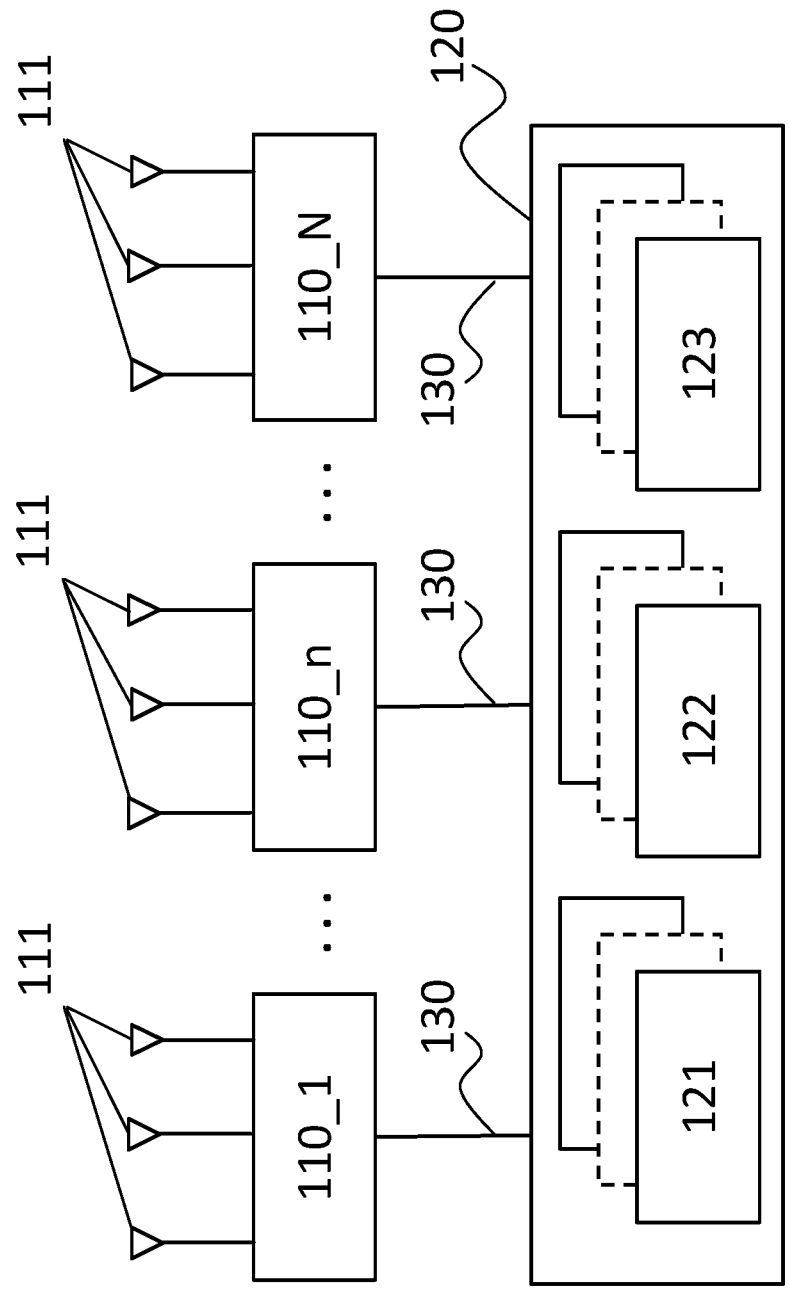
FIG. 1 shows a conventional centralized MIMO architecture.
Figure 2:
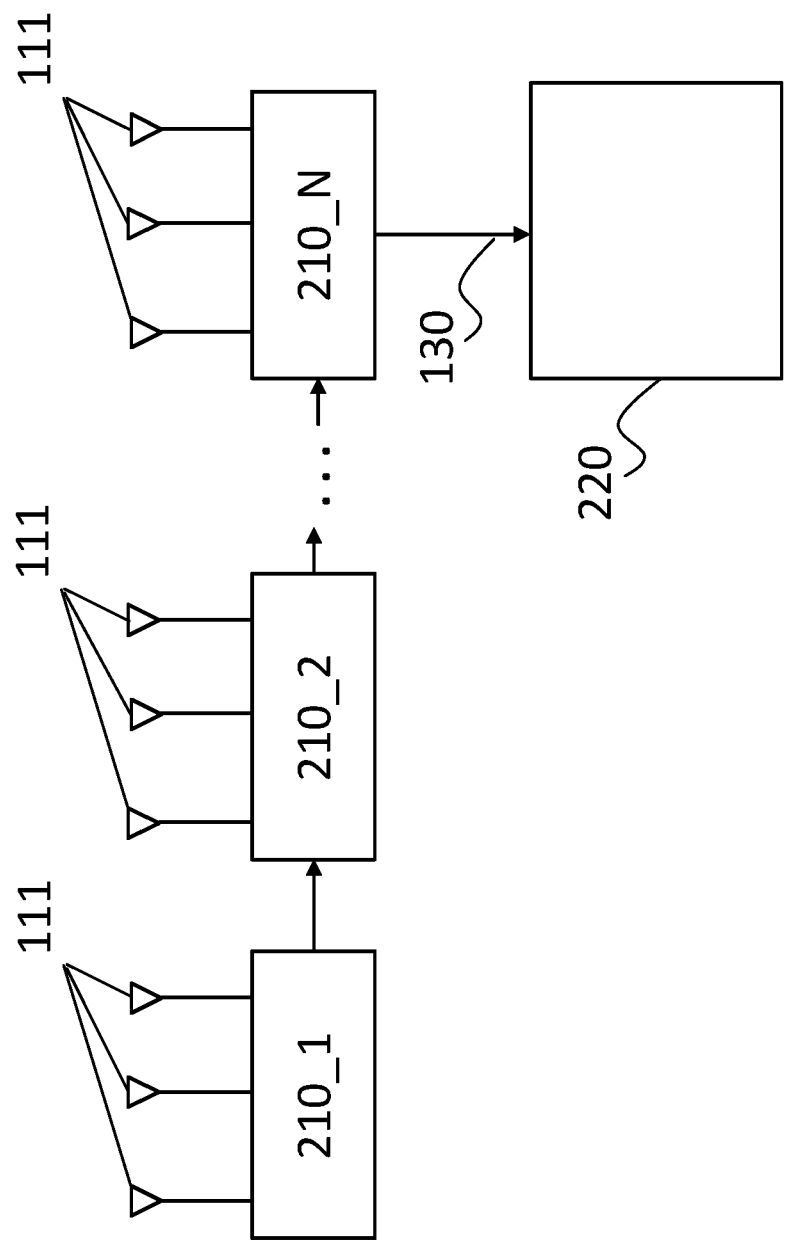
FIG. 2 shows a conventional chained MIMO architecture.
Figure 3:
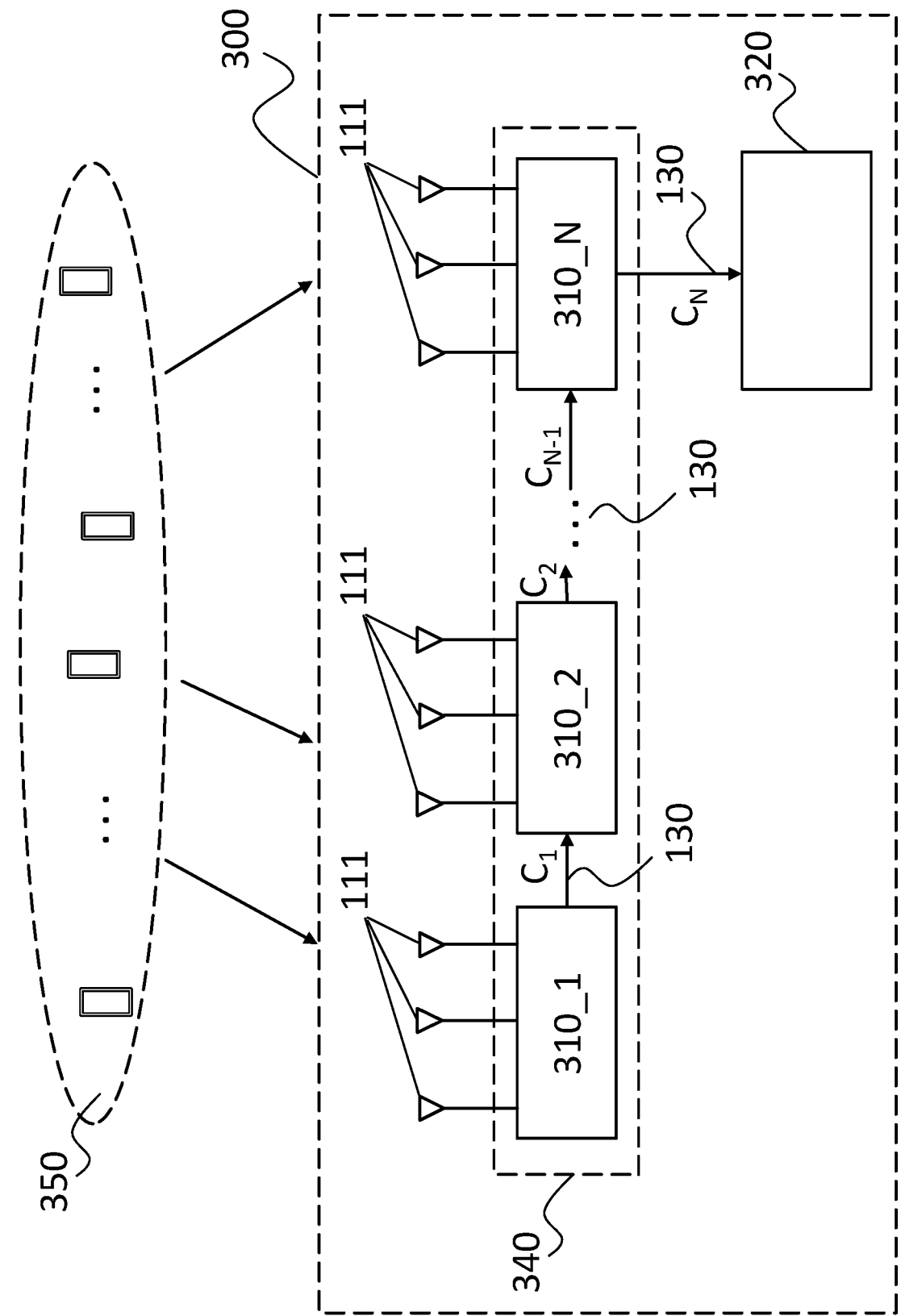
FIG. 3 shows an exemplary arrangement of a system, in which the present disclosure is implemented according to an embodiment of the present disclosure.

FIG. 3 shows an exemplary arrangement of a system, in which the present disclosure is implemented according to an embodiment of the present disclosure. The system of FIG. 3 is an uplink (UL) wireless system and is arranged to serve K user communication devices 350 (e.g., per subcarrier) through a base station (BS) receiver 300, wherein K is a positive integer. According to the present embodiment, the BS receiver 300 is a chained MIMO BS receiver. The chained MIMO BS receiver 300 comprises an arrangement 340 of N RF signal receiving devices or RRU nodes 310_1, 310_2, . . . , 310_N respectively, wherein N is a positive integer. In the following the terms "RF signal receiving device" and "RRU" will be used synonymously. Any one of the RRU nodes 310_1, 310_2, . . . , 310_N comprises one or more antennas, wherein the number of antennas of an n-th RF signal receiving devices or RRU node 310_1, 310_2, . . . , 310_N respectively is denoted exemplary as Ln. Additionally, the chained MIMO BS receiver 300 comprises a signal processing device 320, referred to also as destination central unit (CU) with BBU functionalities or BBU. In the following, the terms "signal processing device" "CU (central unit) with BBU functionalities" and "BBU" will be used synonymously. The UL wireless system is, for example, a wideband single-cell wireless system. The system utilizes, for example, OFDM like waveforms to serve the K user communication devices 350. The user communication devices 350 comprise, for example, stationary and/or mobile user communication devices 350. The present disclosure is not restricted to any particular kind of user communication devices 350. The user communication devices 350 comprise, for example, one or more single-antenna user equipment. The K user communication devices 350 transmit RF signals to the chained MIMO BS receiver 300. Particularly, the K user communication devices 350 transmit the RF signals to the arrangement 340 of N RF signal receiving devices or RRU nodes 310_1, 310_2, . . . , 310_N respectively. The N RF signal receiving devices or RRU nodes 310_1, 310_2, . . . , 310_N respectively receive said RF signals via their antennas 111.

The RF signal receiving devices or RRUs 310_1, 310_2, . . . , 310_N respectively of the arrangement 340 are arranged in a chain 340. I.e. the chain 340 of the RF signal receiving devices or RRUs 310_1, 310_2, . . . , 310_N respectively has a first RF signal receiving device or RRU 310_1 respectively and a last RF signal receiving device or RRU 310_N respectively. The first RF signal receiving device or RRU 310_1 respectively of the chain 340 processes a received RF signal, received by the first RRU 310_1 via one or more antennas 111 of the first RRU 310_1 from the one or more user communication devices 350, and provides its output signal to a next RF signal receiving device or RRU 310_2 respectively of the chain 340. The last RF signal receiving device or RRU 310_N respectively of the chain 340 processes a received RF signal, received by the last RRU 310_N via one or more antennas 111 of the last RRU 310_N from one or more of the user communication devices 350, and output signals of the previous RF signal receiving devices or RRUs 310_1, 310_2, . . . , 310_N−1 respectively of the chain 340 and provides its output signal to the BBU 320. Any one of the RF signal receiving devices or RRUs 310_n respectively (1<n<N) of the chain 340 that is not the first RF signal receiving device or RRU 310_1 and that is not the last RF signal receiving device or RRU 310_N respectively processes a received RF signal, received by the RRU 310_n via one or more antennas 111 of the RRU 310_n from one or more user communication devices 350, and output signals of the previous RF signal receiving devices or RRUs 310_1, . . . , 310_n−1 respectively of the chain 340 and provides its output signal to a next RF signal receiving device or RRU 310_n+1, . . . , 310_N respectively of the chain 340. The output signals of the previous RF signal receiving devices or RRUs 310_1, . . . , 310_n−1 respectively are received by an n-th RRU 310_n of the chain 340 within one message or signal respectively from the previous RRU 310_n−1 in the chain 340. Further, an n-th RRU 310_n provides the output signals of the previous RF signal receiving devices or RRUs 310_1, . . . , 310_n−1 respectively and its own output signal within one message or signal to the subsequent RRU 310_n+1 or to the BBU 320 if the n-th RRU 310_n is the last RRU 310_N of the chain 340.

Figure 4:
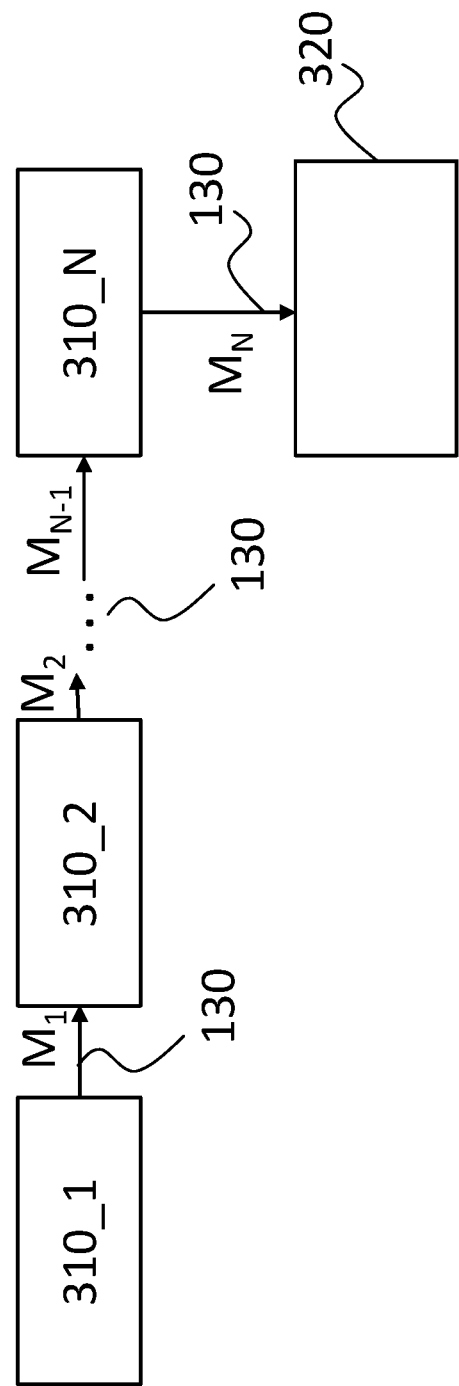
FIG. 4 shows a transmission of messages within an arrangement of N RF signal receiving devices or N RRUs respectively according to an embodiment of the present disclosure.

This transmission of messages within the arrangement or chain 340 of the N RRUs 310_1, 310_2, . . . , 310_N is visualized explicitly in FIG. 4. An n-th RRU 310_n provides a message Mn to the subsequent or next RRU 310_n+1 or to the BBU 320 if the n-th RRU 310_n is the last RRU 310_N of the chain 340. Further, an n-th RRU 310_n (except the first RRU 310_1) of the chain 340 receives a message Mn−1 from the previous RRU 310_n−1. Any one of the messages Mn comprises output signals of the RRUs 310_1 to 310_n.

According to the present embodiment, the RRUs 310_1, 310_2, . . . , 310_N are concatenated or connected in the chain 340 by a fronthaul link (FH) 130 of capacities C1, . . . , CN, as shown in FIG. 3. Any one of the FH links 130 connecting two RRUs 310_1, 310_2, . . . , 310_N has a respective capacity C1, . . . , CN−1. The last RRU 310_N of the chain 340 is connected to the BBU 320. The connection (i.e. FH 130) between the last RRU 310_N of the chain 340 and the BBU 320 has the capacity CN. Thus, any one of the messages M1, . . . , MN is transmitted via a FH link having its specific requirements, conditions and/or parameters such as the capacity C1, . . . , CN.

The CU or BBU 320 respectively is interested in reconstructing the signal transmitted by the K user communication devices 350 per subcarrier, which is then fed to a decoder (not shown) in the CU or BBU 320 respectively to recover the K transmitted messages of the RF signal. In order to reconstruct the RF signal at the CU or BBU 320, any one of the N RRUs 310_1, 310_2, . . . , 310_N forwards a representation of its received RF signal to the CU or BBU 320 respectively via the chain 340 of the N RRUs 310_1, 310_2, . . . , 310_N.

When the k-th user communication device of the K user communication devices 350 wishes to transmit at a transmission rate Rk a message Wk to be decoded at the CU or BBU 320 respectively, the k-th user communication device maps the message Wk and maps the message into a length 1 channel input sequence $x_k \in R^{1 \times l}$. We denote the channel input of the K user communication devices in a subcarrier by:

$$X = [x_1, \ldots x_K] \in R^{K \times l}.$$

Each one of the K user communication devices 350 generates its time-domain signal and forwards it over the channel. An average power constraint $E[|x_k|^2] = P$.

Figure 5:
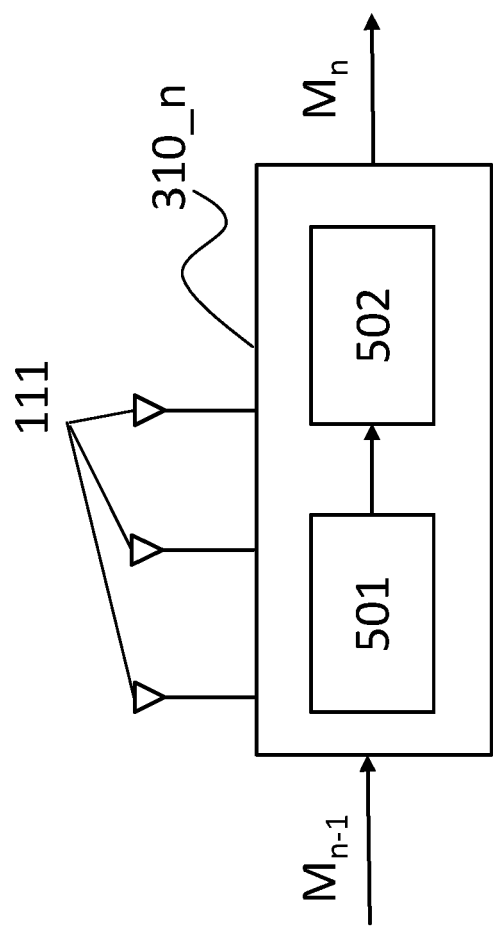
FIG. 5 shows an exemplary arrangement of a RF signal receiving device or RRU respectively according to an embodiment of the present disclosure.

FIG. 5 shows an exemplary arrangement of an n-th RF signal receiving device or RRU 310_n respectively according to an embodiment of the present disclosure. The RRU 310_n is a representative of any one of RF signal receiving devices or RRUs respectively of a chain or arrangement 340 of RRUs 310_1, 310_2, . . . , 310_N.

According to the present embodiment, the RRU 310_n comprises a decompression entity 510 configured to generate n−1 decompressed signals by decompressing n−1 compressed output signals of n−1 previous RRUs 310_1 to 310_n−1 of the chain or arrangement 340 of the N RRUs 310_1, 310_2, . . . , 310_N. As described above, the n−1 compressed output signals are received in a message Mn−1 from a previous RRU 310_n−1 of the arrangement or chain 340 of the RRUs 310_1, 310_2, . . . , 310_N. Signal decompression is generally known. Therefore, any one of the known methods that is appropriate for the signal decompression can be used here.

Further, according to the present embodiment, the RRU 310_n comprises a compression entity 502 configured to generate a compressed output signal by executing a signal compression with regard to the n−1 decompressed signals and with regard to a RF signal received by the RRU 310_n via one or more antennas 111 of the RRU 310_n. According to the present embodiment, the compression entity 502 is configured to execute the signal compression by using a vector coding method. The n−1 decompressed signals and the presentation of the RF signal, as used by the compression entity 502 for the signal compression, compose a vector, with regard to which the vector coding method is executed. Vector coding methods and signal compression are generally known. Therefore, any one of the known methods that is appropriate for the signal compression can be used here. In particular, a joint signal compression is executed by the compression entity 502.

In case the RRU 310_n is the first RRU in the chain 340 of RRUs 310_1, 310_2, . . . , 310_N, the decompression entity 510 will not be operated by the RRU 310_n, and only the compression entity 502 will generate a compressed output signal by executing a signal compression with regard to the RF signal received by the RRU 310_n via its one or more antennas 111.

According to the present embodiment, the signal compression and the decompression are executed based on different parameter values such as available fronthaul capacity C1, . . . , CN, delay and/or CSI requirements. The signal decompression will be executed by taking into consideration the parameters, conditions and/or characteristics of the connection (e.g., fronthaul connection) between the RRU 310_n and the previous RRU 310_n−1 of the chain 340 of the RRUs 310_1, 310_2, . . . , 310_N, said connection being utilized for receiving the n−1 compressed output signals in the message Mn−1. The signal compression, being a joint signal compression, will be executed by taking into consideration the parameters, conditions and/or characteristics of the connection (e.g., fronthaul connection) between the RRU 310_n and the next or subsequent RRU 310_n+1 in the chain or arrangement 340 of the RRUs 310_1, . . . , 310_N or between the RRU 310_n and the BBU 320 if the RRU 310_n is the last RRU 310_N of the chain or arrangement 340 of the RRUs 310_1, . . . , 310_N. The parameters, conditions and/or characteristics, taken into consideration for the execution of the signal decompression and/or joint signal compression comprise, for example, capacity C1, . . . , CN, CSI requirements, delay requirements, and/or CPRI bandwidth.

Figure 6:
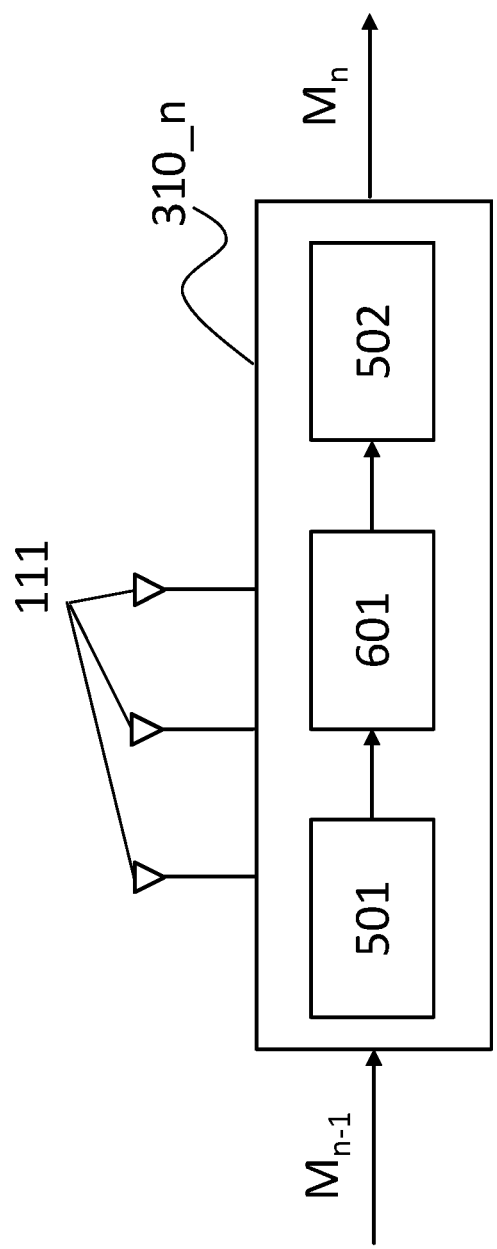
FIG. 6 shows a further exemplary arrangement of a RF signal receiving device or RRU respectively according to an embodiment of the present disclosure.

FIG. 6 shows a further exemplary arrangement of a RF signal receiving device or RRU 310_n respectively according to an embodiment of the present disclosure. The embodiment of FIG. 6 is based on the embodiment of FIG. 5 and supplements the arrangement of the RRU 310_n of FIG. 5.

According to FIG. 6, the RRU 310_n comprises additionally a processing entity 601 configured to execute a signal processing with regard to the n−1 decompressed signals and with regard to the received RF signal before the compression of the n−1 decompressed signals and the received RF signal by the compression entity 502. Thus, the compression entity 502 generates a compressed output signal by executing signal compression (particularly joint signal compression) with regard to n−1 decompressed signals and the received RF signal as processed by the processing entity 601. Particularly, the compression entity 502 executes the signal compression with regard to the processing result of the processing entity 601. According to the present embodiment, the processing entity 601 processes any one of the n−1 decompressed signals.

According to an embodiment, explained below in more detail, the signal processing executed by the processing entity 601 comprises a generation of an innovation signal by executing an innovation computation with regard to the n−1 decompressed signals and with regard to the received RF signal. According to the present embodiment, the processing entity 601 executes the innovation computation with regard to any one of the n−1 decompressed signals. The result of the innovation computation is an innovation signal. The innovation computation is generally well known. Thus any one of appropriate known innovation computation methods can be used by the processing entity 601. The compression entity 502 executes then the signal compression by compressing the result of the innovation computations, i.e. by compressing the innovation signal. The compression entity 502 outputs the compressed innovation signal as the compressed output signal of the RRU 310_n.

According to another embodiment, explained below in more detail, the signal processing, executed by the processing entity 601, comprises a generation of an estimation signal of an estimation of a function of N RF signals, received at the N RRUs 310_1, 310_2, ... , 310_N, with regard to the n−1 decompressed signals and with regard to the received RF signal. The compression entity 502 is then configured to execute the signal compression by compressing the estimation signal and to output the compressed estimation signal as the compressed output signal. The estimation of a function of N RF signals may refer, for example, to a beamforming estimation function applied with regard to the N RF signals.

According to a further embodiment, the estimation signal is, for example, a distributed beamforming estimation signal and the generation of the estimation signal comprises a generation of the distributed beamforming estimation signal by executing a beamforming estimation with regard to the n−1 decompressed signals and with regard to the received RF signal. The beamforming estimation is executed, for example, with regard to any one of the n−1 decompressed signals. The beamforming estimation is executed, for example, with regard to a beamformed received RF signal, and any one of the n−1 decompressed signals is a beamformed signal. As shown below, the RRU 310_n comprises for this purpose a beamforming entity that is configured to execute beamforming with regard to the received RF signal. The beamforming is executed, for example, by using a distributed beamformer filter.

According to a further embodiment, the distributed beamformer filter is determined by the RRU 310_n, and the processing entity 610 executes the beamforming by use of the distributed beamformer filter as determined by the RRU 310_n. According to an alternative embodiment, the RRU 310_n receives information on the distributed beamformer filter to be used by the processing entity 610 of the RRU 310_n from the BBU 320.

Figure 7:
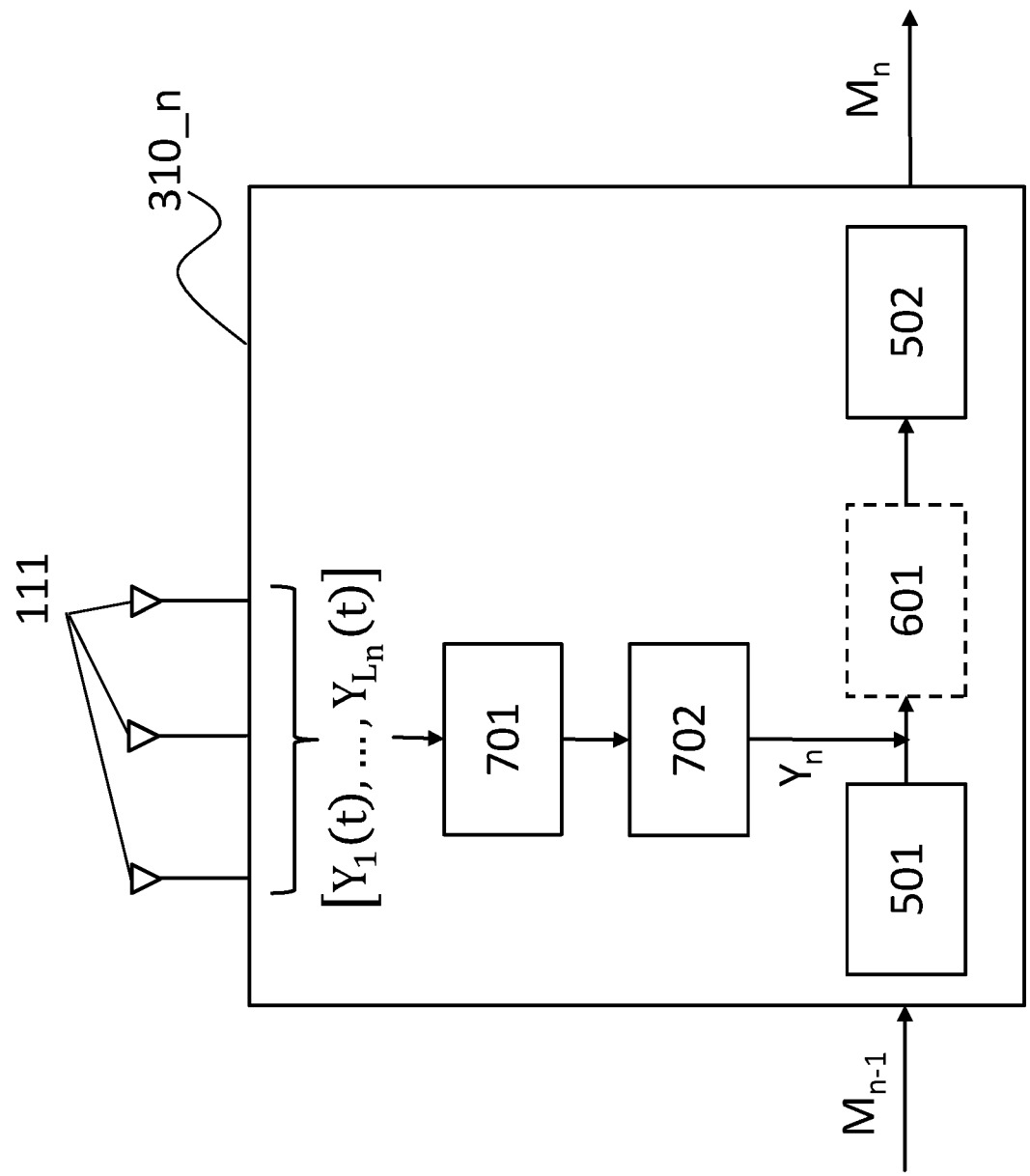
FIG. 7 shows a further exemplary arrangement of a RF signal receiving device or RRU respectively according to an embodiment of the present disclosure.

FIG. 7 shows a further exemplary arrangement of a RF signal receiving device or RRU 310_n respectively according to an embodiment of the present disclosure. The embodiment of FIG. 7 is based on the embodiment of FIG. 5 and/or on the embodiment of FIG. 6 and supplements the arrangement of the RRU 310_n of FIG. 5 and/or of FIG. 6.

Particularly, FIG. 7 exemplary shows the processing carried out at the n-th RRU 310_n in response to the transmission of RF signals [$x_1, \ldots, x_K$] by the user communication devices 350 to the chained MIMO BS receiver 300. First, the RF signals [$x_1, \ldots, x_K$], transmitted by the K user communication devices, are received at the Ln antennas 111 of the n-th RRU 310_n as RF signals [$Y_1(t), \ldots, Y_{L_n}(t)$] and are sampled and processed by an analog-to-digital conversion (ADC) unit 701 of the RRU 310_n, which provides an Ln dimensional digital time-domain signal.

Then, the digitized time-domain signal is processed, for example, by a digital BB block 702 of the n-th RRU 310_n. The digital BB block 702 applies, for example, frequency processing (e.g., fast Fourier transformation (FFT) and cyclic prefix (CP) removal functionalities). After the frequency domain processing in the digital BB block 702, a frequency domain signal $Y_n \in R^{L_n \times l}$ is obtained by the RRU 310_n. The frequency domain signal $Y_n$ is given by:

$$Y_n = H_n X + Z_n, n = 1, 2, \ldots, N$$

where the channel matrix is defined as $H_n = [h_{n,1}^T, \ldots, h_{n,K}^T]^T \in R^{L_n \times K}$, $h_{l,k} = [h_{n,k,1}, \ldots, h_{n,k,M}]^T$ and $h_{n,l_n,k}$ denotes a channel coefficient between the ln-th receive antenna 111 and the k-th user communication device at n-th RRU 310_n; and Zn is the length l i.i.d. zero-mean additive noise vector sequence $Z_n \in R^{l \times l}$ experienced at the Ln antennas with $C_z = \sigma^2 I$.

The frequency domain signal $Y_n$ represents the RF signal received via the antennas 111 of the RRU 310_n and processed further as described above and explained in more detail below. The RRU 310_n uses the RF signal $Y_n$ for generating a rate Cn message Mn to be forwarded to the next RRU 310_n+1.

When considering the embodiment of FIG. 5, the compression entity 502 of RRU 310_n takes as inputs the received RF signal Yn and the decompressed n−1 output signals, received with the message Mn−1 from the previous RRU 310_n−1 and decompressed by the decompression entity 501, and generates a compressed output signal by executing a joint compression with regard to the received RF signal $Y_n$ and the decompressed n−1 output signals. Then, the RRU 310_n (e.g., the decompression entity 501 of the RRU 310_n) outputs a message Mn comprising the compressed output signal. The n-th RRU 310_n forwards the message Mn to the next (i.e., n+1-th) RRU 310_n+1 or to the BBE 320 if the n-th RRU 310_n is the last RRU 310_N of the chain or arrangement 340 of the N RRUs 310_1, 310_2, ... , 310_N. Here, it has to be noted that, if the n-th RRU 310_n is the first RRU 310_1 of the chain or arrangement 340 of the N RRUs 310_1, 310_2, ... , 310_N, the decompression entity 501 of the first RRU 310_1 will not be operated and the compression entity 501 will generate the compressed output signal by executing the signal compression with regard to the received RF signal Y1 only.

When considering the embodiment of FIG. 6, the received RF signal Yn and the decompressed n−1 output signals, received with the message Mn−1 from the previous RRU 310_n−1 and decompressed by the decompression entity 501, are first processed by the processing entity 601 of the RRU 310_n. Then, the compression entity 502 of RRU 310_n takes as input the processing result (i.e. output) of the processing entity 610 and executes the signal compression with regard to the processing result for generating a compressed output signal. Subsequently, the RRU 310_n (e.g., the decompression entity 501 of the RRU 310_n) outputs a message Mn comprising the compressed output signal. The n-th RRU 310_n forwards the message Mn to the next (i.e., n+1-th) RRU 310_n+1 or to the BBE 320 if the n-th RRU 310_n is the last RRU 310_N of the chain or arrangement 340 of the N RRUs 310_1, 310_2, ... , 310_N. Also here, it has to be noted that, if the n-th RRU 310_n is the first RRU 310_1 of the chain or arrangement 340 of the N RRUs 310_1, 310_2, ... , 310_N, the decompression entity 501 of the first RRU 310_1 will not be operated. Instead, the processing entity 601 will process the received RF signal Y1 only, and the compression entity 501 will generate the compressed output signal by executing the signal compression with regard to the processing result (i.e. output of the processing entity 601) of the processing entity 601 only.

Figure 8:
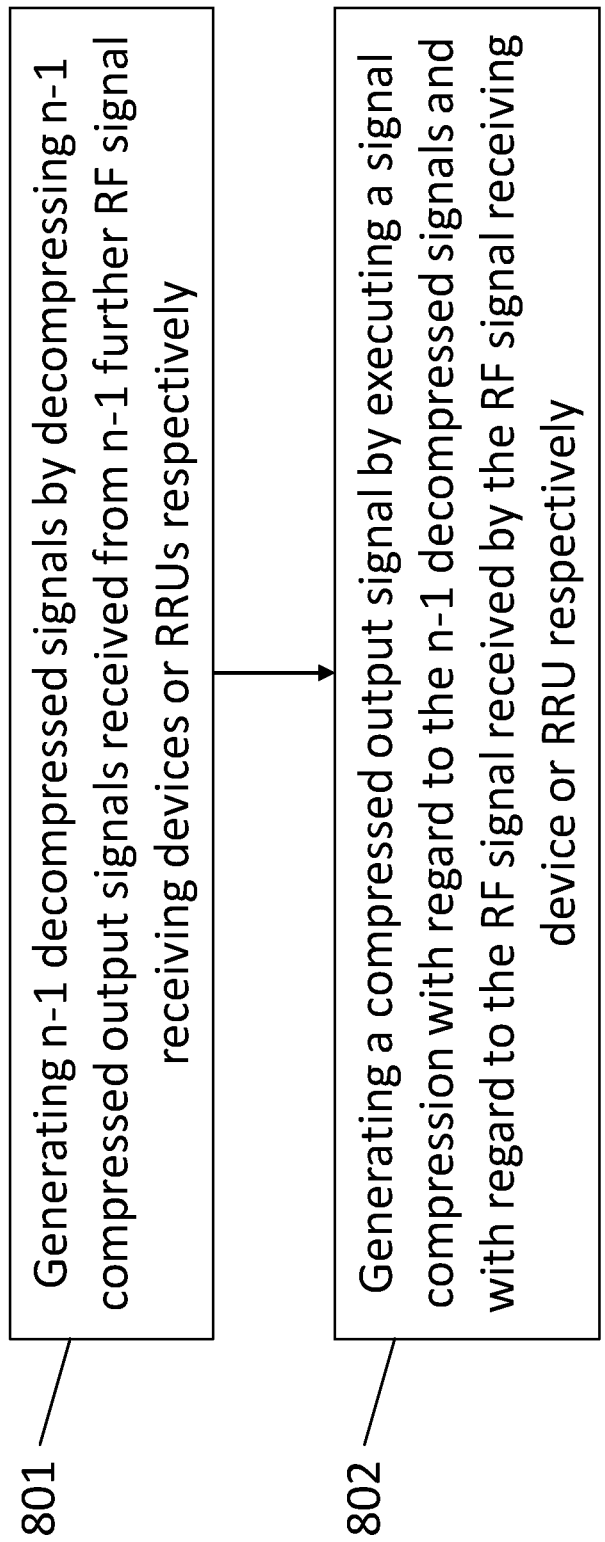
FIG. 8 shows actions executed by a RF signal receiving device or RRU respectively according to an embodiment of the present disclosure.

FIG. 8 shows actions executed by an n-th RF signal receiving device or RRU 310_n respectively according to an embodiment of the present disclosure. Particularly, the actions reflect the embodiment of FIG. 5.

In block 801, n−1 compressed signals are generated by decompressing n−1 compressed output signals received from n−1 further, i.e. previous RF signal receiving devices or RRUs 310_1, ... , 310_n−1 respectively. The block 801 is executed as described herein with regard to the decompression entity 501 of the RRU 310_n and with regard to RRUs 310_1, 310_2, . . . , 310_N in general.

In block 802, a compressed output signal is generated by executing a signal compression with regard to the n−1 decompressed signals and with regard to the RF signal received by the RF signal receiving device or RRU 310_n respectively. The block 802 is executed as described herein with regard to the compression entity 502 of the RRU 310_n and with regard to RRUs 310_1, 310_2, . . . , 310_N in general.

Figure 9:
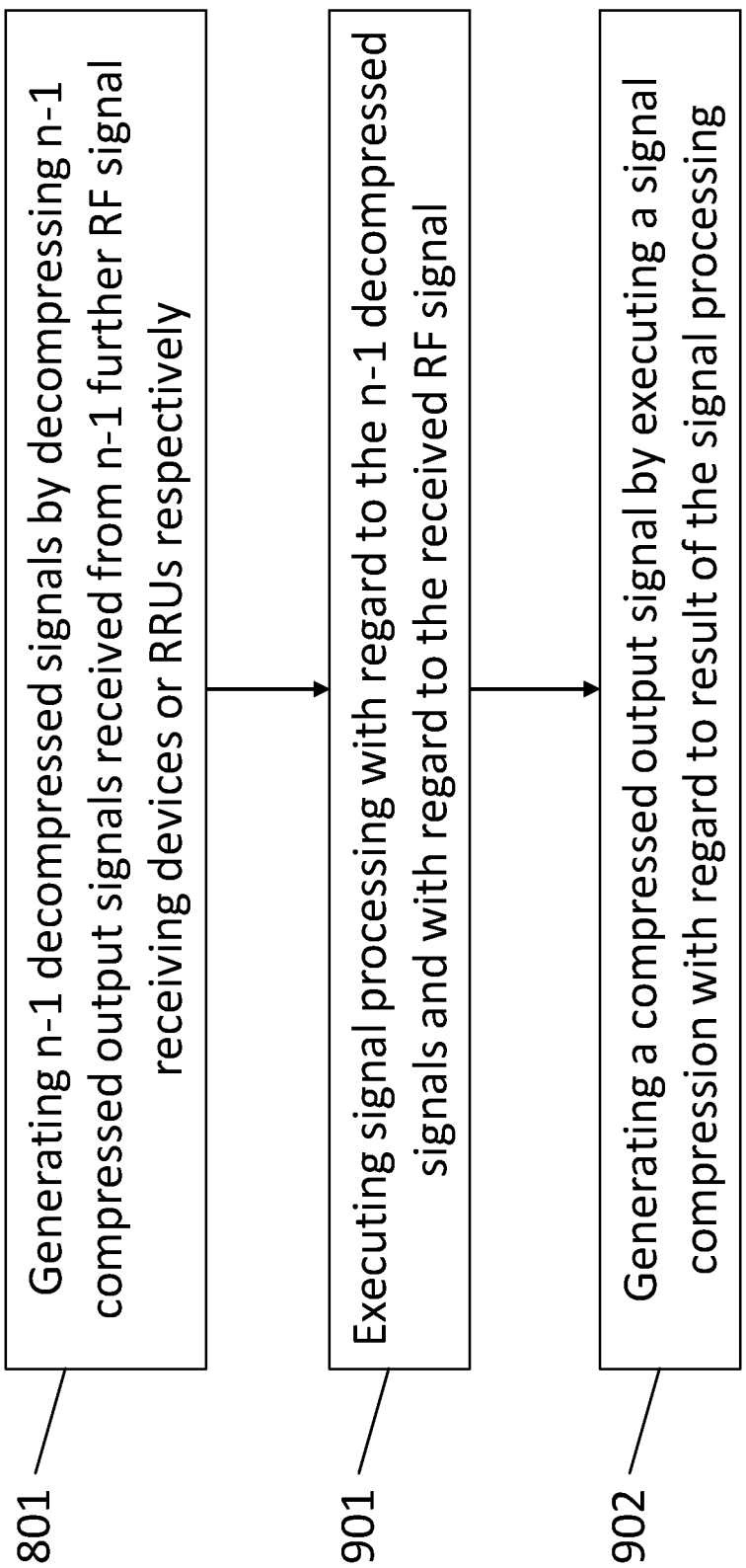
FIG. 9 shows actions executed by a RF signal receiving device or RRU respectively according to an embodiment of the present disclosure.

FIG. 9 shows actions executed by a RF signal receiving device or RRU respectively according to an embodiment of the present disclosure. Particularly, the action reflect the embodiment of FIG. 6. The first block of the embodiment of FIG. 9 is the block 801, described already above.

In block 901, signal processing is executed with regard to the n−1 decompressed signals and with regard to the received RF signal. The block 901 is executed as described herein with regard to the processing entity 601 of the RRU 310_n and with regard to RRUs 310_1, 310_2, . . . , 310_N in general.

In block 902 similarly to block 802, a compressed output signal is generated by executing a signal compression with regard to the n−1 decompressed signals and with regard to the RF signal received by the RF signal receiving device or RRU 310_n respectively. However, in block 902 the result of the signal processing 901 is used for generating a compressed output signal. The block 902 is executed as described herein with regard to the compression entity 502 of the RRU 310_n and with regard to RRUs 310_1, 310_2, . . . , 310_N in general.

Figure 10:
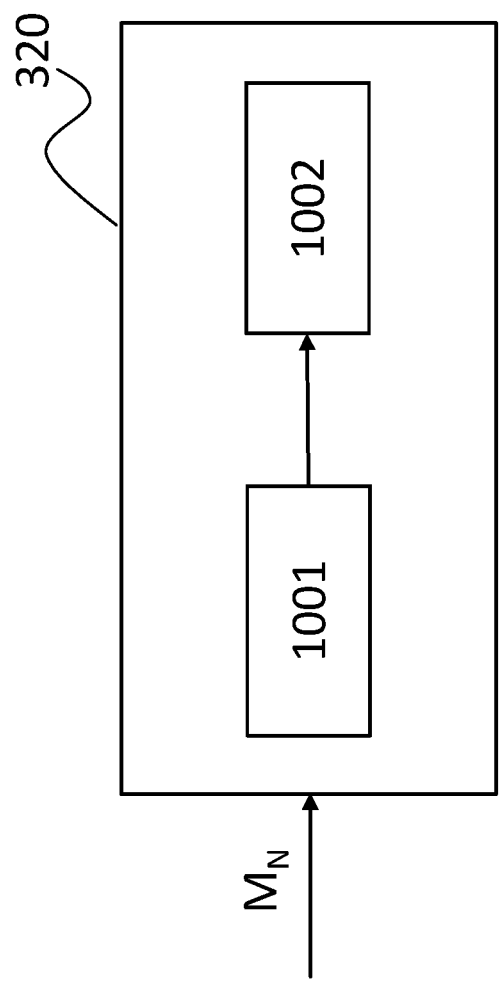
FIG. 10 shows an exemplary arrangement of a signal processing device or BBU respectively according to an embodiment of the present disclosure.

FIG. 10 shows an exemplary arrangement of a signal processing device or BBU 320 respectively according to an embodiment of the present disclosure. As described above, the BBU 320 receives a message MN from the last RRU 310_N of the arrangement or chain 340 of the N RRUs 310_1, 310_2, . . . , 310_N. The message MN comprises compressed output signals of all N RRUs 310_1, 310_2, . . . , 310_N. According to the present embodiment, the BBU 320 comprises a receiving entity 1001 that is configured to receive the message MN and particularly to receive the compressed output signal from the last RRU 310_N of the arrangement or chain 340 of the N RRUs 310_1, 310_2, . . . , 310_N.

Further, the BBU 320 comprises a signal reconstruction entity 1002 configured to execute a signal reconstruction by use of the message MN and particularly by use of the compressed output signal from the last RRU 310_N.

The present disclosure allows a different execution of the signal decompression 801 and signal compression 802, 902, particularly, joint compression 802, 902. The way of execution of the decompression 801 and compression 802, 902 depends on the amount of channel state information (CSI) available at the one or more RRUs 310_1, 310_2, . . . , 310_N and the delay requirements of the system. Thus, for example, in case of no CSI, a centralized beamforming can be executed where, for example, the innovative part of the received RF signal at each RRU 310_1, 310_2, . . . , 310_N is executed. In case of global CSI, a distributed beamforming can be executed where, for example, a function computed with the received RF signal and the decompressed signal(s) at each RRU 310_1, 310_2, . . . , 310_N is executed. In the following both cases will be discussed in more detail.

Figure 11:
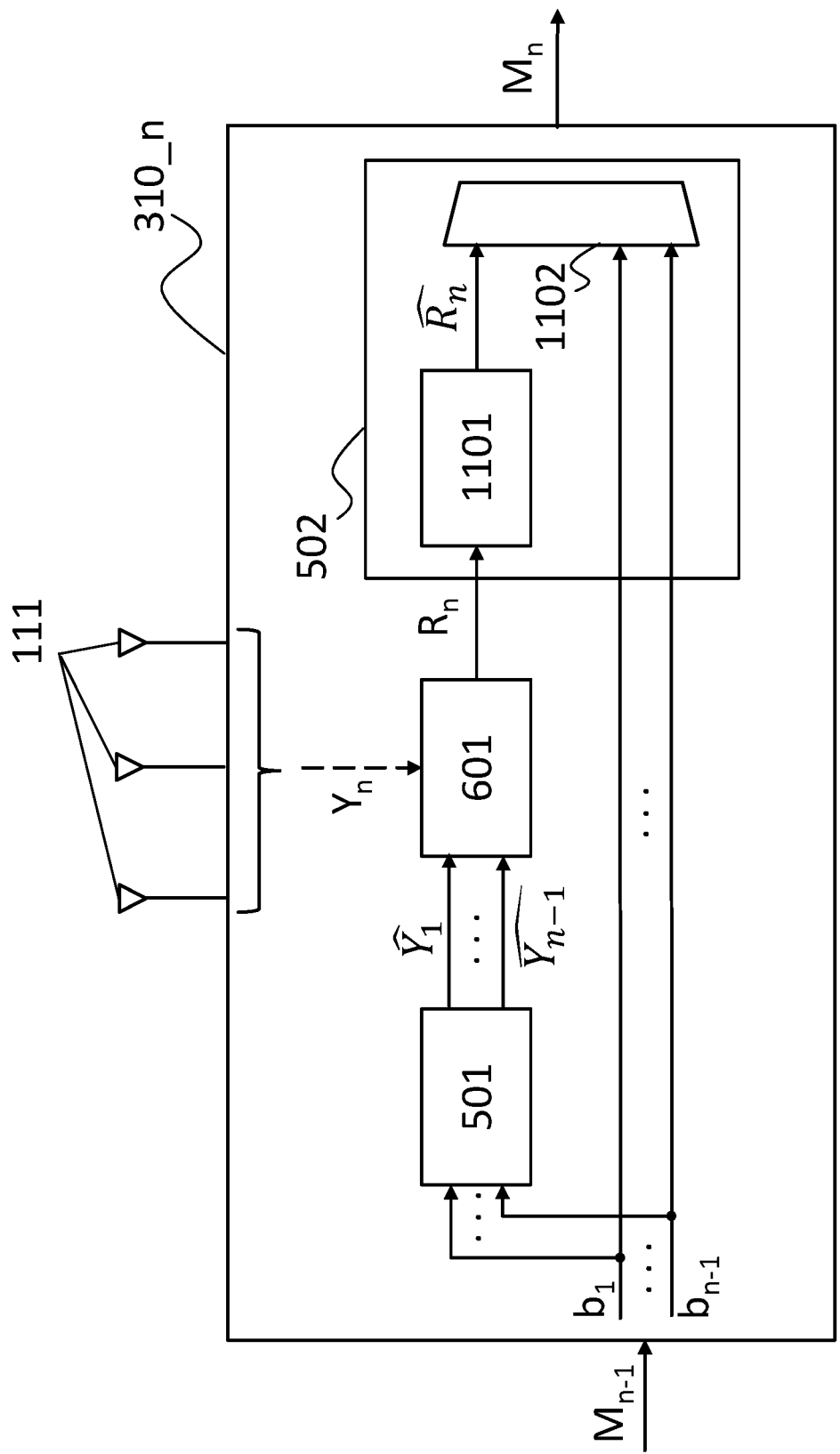
FIG. 11 shows an exemplary arrangement of a RF signal receiving device or RRU respectively according to an embodiment of the present disclosure.

At first, the case of no available CSI will be considered by use of FIG. 11.

FIG. 11 shows an exemplary arrangement of a RF signal receiving device or RRU 310_n respectively according to an embodiment of the present disclosure. The RF signal receiving device or RRU 310_n respectively is in general arranged as discussed above, wherein FIG. 11 shows further arrangement of the RF signal receiving device or RRU 310_n respectively.

As shown in FIG. 11, the n-th RRU 310_n receives as input the message Mn−1 from the previous RRU 310_n−1. The message Mn−1 comprises n−1 compressed output signals b1, . . . , bn−1 of the preceding RRUs 310_1, . . . , 310_n−1, which are provided to the decompression entity 501. The decompression entity 501 takes the compressed output signals b1, . . . , bn−1 as input signals and decompresses them. Particularly, according to the present embodiment, the decompression entity 501 executes the decompression by use of the parameters, conditions and/or requirements of the FH link connecting the previous RRU 310_n−1 and the RRU 310_n. The parameters, conditions and/or requirements comprise, for example, the amount of CSI and/or the delay requirements. By decompressing, the decompression entity 501 generates n−1 decompressed signals $\hat{Y}_1, \ldots, \widehat{Y_{n-1}}$. The n−1 decompressed signals $\hat{Y}_1, \ldots, \widehat{Y_{n-1}}$ are provided from the decompression entity 501 to the processing entity 601.

The processing entity 601 receives, besides the n−1 decompressed signals $\hat{Y}_1, \ldots, \widehat{Y_{n-1}}$, also the received RF signal $Y_n$ and processes the received signals. According to the present embodiment, the processing entity 601 executes an innovation computation comprising a generation of an estimation of the innovative part of $Y_n$ given the $\hat{Y}_1, \ldots, \widehat{Y_{n-1}}$, wherein the estimation of the innovative part of $Y_n$ is referred to as innovation signal and denoted by $R_n$.

According to the present embodiment, the processing entity 601 computes the innovative sequence or signal $R_n$ by computing the error of estimating $Y_l$ from $\hat{Y}_1, \ldots, \widehat{Y_{n-1}}$ such as linear minimum mean square error (LMMSE) as follows:

$$R_n = Y_n - \text{LMMSE}[Y_n | \widehat{Y_n}, \ldots, \widehat{Y_{n-1}}] = Y_n - V_n [\hat{Y}_1, \ldots, \widehat{Y_{n-1}}]^T,$$

where $V_l \in \mathbb{R}^{L_n \times (L_1 + \cdots + L_{n-1})}$ is the LMMSE filter given by $V_n = C_{y_n \bar{y}_{n-1}} C_{\bar{y}_{n-1}}^{-1}$ with the correlation matrices $$C_{y_n \bar{y}_{n-1}} = E[Y_n \cdot [\hat{Y}_1, \ldots, \widehat{Y_{n-1}}]^T] \text{ and}$$

$$C_{\bar{y}_{n-1}} = E[[\hat{Y}_1, \ldots, \widehat{Y_{n-1}}] \cdot [\hat{Y}_1, \ldots, \widehat{Y_{n-1}}]^T].$$

The covariance matrix of the innovation sequence is given by the LMMSE error $$C_{R_n} = C_{y_n} - C_{y_n \bar{y}_{n-1}} C_{\bar{y}_{n-1}}^{-1} C_{y_n \bar{y}_{n-1}}^T, \text{ where } C_{y_n} = E[Y_n Y_n^T].$$

After the generation of the innovation signal $R_n$, a compressed version of the innovation signal $R_n$ is generated by the compression entity 502. According to the present embodiment, the compression entity 502 comprises two units—a compression unit 1101 and a multiplexer 1102. The compressed version of the innovation signal $R_n$ is denoted by $\widehat{R_n}$. The compression unit 1101 of the compression entity 502 compresses the innovation or the innovation signal $R_n$ respectively at a rate $B_n$ satisfying $B_1 + \ldots + B_n = C_n$, and described by the message $\widehat{M_n}$, wherein $B_1, \ldots, B_{n-1}$ are rates used for previous transmissions of respective messages $M_1, \ldots, M_{n-1}$.

The compression unit 1101 of the compression entity 502 compresses the innovation or the innovation signal $R_n$ respectively by using a vector compression method (e.g., a transform coding method) to generate a compression message $\widetilde{M_n}$ of rate $B_n$ utilizing the covariance matrix $C_{R_n}$ as follows. Vector transmission methods (e.g., transform coding methods) are generally known, and any appropriate vector transmission method (e.g., transform coding method) may be used here. For example, A. E. Gamal and Y-H. Kim: "Network Information Theory", Cambridge University Press, 2011 describes a transform coding method that can be used according to the present embodiment.

The singular value decomposition (SVD) of $C_{R_n}$ is computed as $C_{R_n} = U_n \Lambda_n U_n^T$ and the innovation signal is projected as $\widehat{R_n} = U^T R_n$. Then each of the $L_n$ components of $\widehat{R_n}$ is quantized at $b_{n,l_n}$, $l_n=1, \ldots, L_n$ such that $b_{n,1}, \ldots, b_{n,L_n}$, are obtained with the following reverse water filling problem:

$$(b_{n,1}, \ldots, b_{n,L_n}) = \operatorname{argmin} \sum_{l_n=1}^{L_n} \log\left(\frac{\lambda_{n,l_n}}{d_{n,l_n}}\right), \text{ s.t. } \sum_{l_n=1}^{L_n} d_{n,l_n} = B_n$$

where $d_{n,l_n} = \min\{\lambda_{n,l_n}, \theta\}$, where $\lambda_{n,i}$ is the $l_n$-th eigenvalue of $C_{R_n}$ and $\theta$ is chosen such that the constraint is satisfied. The reverse water filling problem is described, for example, in A. E. Gamal and Y.-H. Kim: "Network Information Theory", Cambridge University Press, 2011. Subsequently, the message $M_n = [M_{n-1}, \widetilde{M_n}]$ is forwarded to the next unit.

As to the decompression of $\hat{Y}_1, \ldots, \widetilde{Y_{n-1}}$ from the message Mn−1 received at the RRU 310_n wherein $M_{n-1} = [\widetilde{M_1}, \ldots, \widetilde{M_{n-1}}]$, in order to do that at the decompression entity 501, first the compressed innovation sequences $\widehat{R_n}$ i=1, ..., n−1 are obtained by reconstructing the quantized components of $\widehat{R_n}$, denoted by $\widetilde{\widehat{R_n}}$ and by inverting the projection as $\widetilde{R_n} = U_i \widetilde{\widehat{R_{n,1}}}$. It is denoted that the compressed sequence $\widetilde{R_n}$ is characterized as:

$$\widetilde{R_n} = R_n Q_n = Y_n - V_n [\hat{Y}_1, \ldots, \widetilde{Y_{n-1}}]^T + Q_n$$

where the quantization noise $Q_n$ has covariance matrix $$\Sigma_n = U_n \operatorname{diag}(\lambda_{n,1} 2^{-b_{n,1}}, \ldots, \lambda_{1,l_n} 2^{-b_{n,l_n}}) U_n^T.$$

Then, the sequences $\hat{Y}_1, \ldots, \widetilde{Y_{n-1}}$ are successively reconstructed as:

$$\widetilde{Y_n} = \widetilde{R_n} - V_n[\hat{Y}_1, \ldots, \widetilde{Y_{n-1}}]^T = Y_n + Q_n \text{ for } i=1, \ldots, n-1.$$

As to the arrangement of the signal processing device or BBU 320 respectively in the case of no available CSI, it is referred to FIG. 10.

In the case of no available CSI, the BBU 320 will take as input the message MN from the last RRU 310_N. The message MN is received, for example, by the receiving entity 1001 of the BBU 320 via the FH 130 connecting the last RRU 310_N with the BBU 320. Then, the signal reconstruction entity 1002 of the BBU 320 reconstructs the RF signals $\hat{Y}_1, \ldots, \widetilde{Y_N}$ received at the N RRUs 310_1, 310_2, ..., 310_N. Subsequently, the signal reconstruction entity 1002 of the BBU 320 computes the centralized beamforming filter W and generates an estimation of the transmitted symbols as:

$$\hat{X} = W[\hat{Y}_1, \ldots, \widetilde{Y_N}]^T.$$

Before executing the reconstruction as outlined above, the signal reconstruction entity is also configured to decompress the N compressed output signals of the message MN. For this purpose, the N compressed output signals $\hat{Y}_1, \ldots, \widetilde{Y_N}$ are decompressed by decompressing at first $\widetilde{R_1}, \ldots, \widetilde{R_N}$ as already described above with regard to RRU 310_N. Then, the channel input symbols g are estimated with the centralized beamformer filter W as $\hat{X} = W[\hat{Y}_1, \ldots, \widetilde{Y_N}]^T$, where W is an MMSE filter and $$W = PH^T(PHH^T + \sigma^2 I_{L_1 + \ldots + L_N} + \overline{\Sigma})^{-1}$$

where $H = [H_1 \ldots H_N]^T$, and $\overline{\Sigma} = \operatorname{diag}([\Sigma_1, \ldots, \Sigma_N])$.

In the following, the case of presence of a global CSI will be considered in more detail. As mentioned above, in this case, a distributed beamforming can be executed where, for example, a function computed with the received RF signal and the decompressed signal(s) at each RRU 310_1, 310_2, ..., 310_N is executed.

Figure 12:
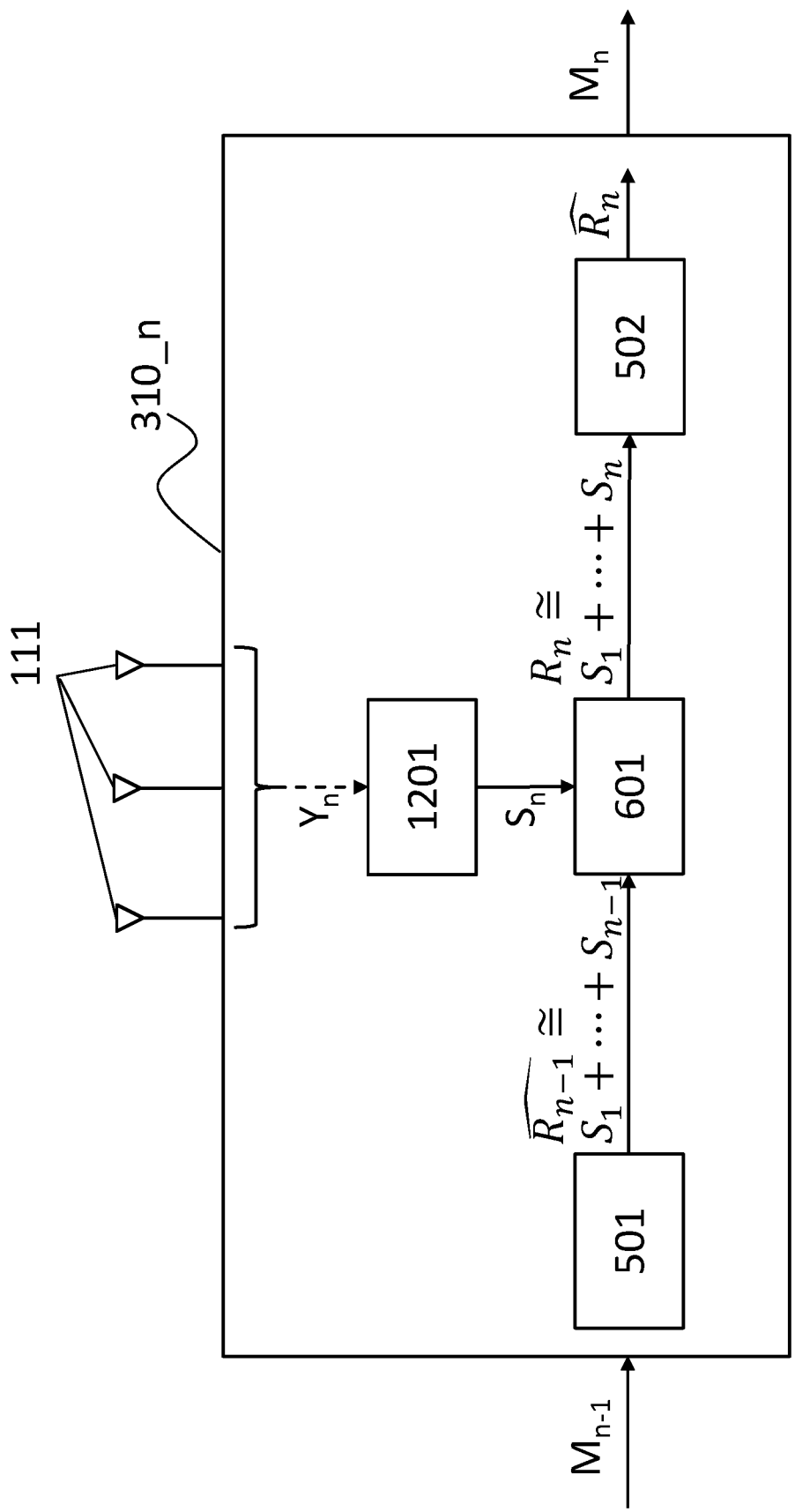
FIG. 12 shows an exemplary arrangement of a RF signal receiving device or RRU respectively according to an embodiment of the present disclosure.

FIG. 12 shows an exemplary arrangement of an n-th RF signal receiving device or RRU 310_n respectively according to an embodiment of the present disclosure. The RF signal receiving device or RRU 310_n respectively is in general arranged as discussed above, wherein FIG. 12 shows a further arrangement of the RF signal receiving device or RRU 310_n respectively provided with regard to the case where a global CSI is present.

According to the present embodiment, the decompression entity 501 of the n-th RRU 310_n takes as input the message MN−1 from the previous RRU 310_n−1. According to the present embodiment, the decompression entity 501 uses, for example, also the amount of CSI and delay requirements of the connection (e.g., FH 130) between the n-th RRU 310_n and the previous RRU 310_n−1 for decompressing the n−1 signals from the previous RRUs 310_1, ..., 310_n−1, denoted by $\widetilde{R_{n-1}}$.

For the subsequent joint compression, according to the present embodiment, the decompressed signal $\widetilde{R_{n-1}}$ at the decompression entity 501, the received RF signal $Y_n$, the amount of CSI and delay requirement and the available backhaul $C_n$ to the next RRU 310_n+1 are used as inputs. The joint compression for generating the message $M_n$ is then executed as follows.

According to the present embodiment, a beamforming entity 1201 is provided in the n-th RRU 310_n. The beamforming entity 1201 applies, for example, a distributed beamformer filter, denoted by $W_l$ on the received RF signal $Y_n$ to generate a beamformed sequence or signal $S_n = W_n Y_n$.

The processing entity 601 is determines as an estimation signal an estimation of the sum (or any other function) of the beamformed signals at the previous RRUs 310_1, ..., 310_n−1 denoted by $R_n \cong S_1 + \ldots + S_n$ by filtering the decompressed sequence $\widetilde{R_{n-1}}$ and the beamformed signal $S_n$, received from the beamforming entity 1201.

The compression entity 502 generates then a compressed output signal as a compressed version of the sum of beamformed sequences $R_n$, denoted by $\widehat{R_n}$ at a rate $C_n$ and described by the message $M_n$.

Particularly, according to the present embodiment, the beamforming entity 1201 computes the beamformed sequence $S_n$ with the beamforming filter $W_n$ as $S_n = W_n Y_n$. Then, the sum of previous beamformed signals $R_n$ is estimated with an LMMSE filter as $$R_n = E[S_1 + \ldots + S_n | \widetilde{R_{n-1}}, S_n] = \tilde{V}_n [\widetilde{R_{n-1}}, S_n]^T$$

where $V_n \in \mathbb{R}^{L_n \times (n K)}$ the LMMSE filter given by $V_n = C_{\Sigma S, Rs, n} C_{Rs,n}^{-1}$ with the correlation matrices $$C_{\Sigma S, RS, n} = E[S_1 + \ldots + S_n \cdot [\widehat{R_{n-1}, S_n}]^T] \text{ and}$$

$$C_{RS,n} = E[[\widehat{R_{n-1}, S_n}] \cdot [\widehat{R_{n-1}, S_n}]^T].$$

The covariance matrix of the sum sequence $R_n$ is given by the LMMSE error $$C_{R_n} = C_{S_n} - C_{\Sigma S, RS, n} C_{RS, n}^{-1} C_{\Sigma S, RS, n}^T,$$

where $C_{S_n} = E[S_n S_n^T]$.

The sum sequence $R_n$ is compressed using a transform coding algorithm to generate the compression message $M_n$ of rate $C_n$ utilizing the covariance matrix $C_{R_n}$ as described above. The message $M_n$ is forwarded to the next RRU 310_$n$+1, and message $M_{n-1}$ is discarded.

As to the decompression of $\widehat{R_n}$ from the message $M_{n-1}$, received at the n-th RRU 310_$n$, the decompression is done by the decompression entity 501, according to the present embodiment, by reconstructing the quantized components of $\widehat{R_n}$, denoted by $\widetilde{R_n}$ and by inverting the projection as $\widehat{R_n} = U_n \widetilde{R_{n,1}}$. The compressed sequence $\widehat{R_n}$ is characterized according to the present embodiment as:

$$\widehat{R_n} = R_n + Q_n = S_1 + \ldots + S_n + Q_n$$

where the quantization noise $Q_n$ has a covariance matrix $$\Sigma_n = U_n \text{diag}(\lambda_{n,1} 2^{-b_n,1}, \ldots, \lambda_{1,J_n} 2^{-b_n,J_n}) U_n^T.$$

As to the arrangement of the signal processing device or BBU 320 respectively in the case of the presence of a global CSI, it is referred to FIG. 10.

In the case of presence of a global CSI, the BBU 320 will take as input the message MN from the last RRU 310_N. The message MN is received, for example, by the receiving entity 1001 of the BBU 320 via the FH 130 connecting the last RRU 310_N with the BBU 320. Then, the signal reconstruction entity 1002 of the BBU 320 reconstructs the signal of the sum of beamformed signals $S_1 + \ldots + S_N$ by decompressing $\widehat{R_N}$. Subsequently, the transmitted symbols are reconstructed by the signal reconstruction entity 1002 as $\hat{X} = \widehat{R_n}$.

Before the reconstruction of the transmitted signals, the signal $\widehat{R_N}$ is decompressed from message $M_N$ as explained above with regard to the n-th RRU 310_$n$.

By use of the present disclosure, as explained above, minimizing of error vector magnitude (EVM) between K transmitted channel inputs of user communication devices 350 and K reconstructed channel inputs at the destination unit is achieved. In particular, the minimizing of the EVM is achievable for a given available fronthaul capacity and provided that the delay and CSI requirements for the system are satisfied.

The EVM measures the average quadratic error between symbols X transmitted by the K user communication devices 350 and the reconstruction of the transmitted symbols X at the destination unit as reconstructed symbols $\hat{X}$. The EVM is defined as:

$$EVM = \frac{\sum_{k=1}^{K} E\|x_k - \widehat{x_k}\|^2}{\sum_{k=1}^{K} E\|x_k\|^2}.$$

In order to compare the FH requirements, the compression ratio is configured, wherein the compression ratio is defined as a ratio between bits (throughput) required to transmit n vectors samples between the RRUs 310_1, 310_2, . . . , 310_N and the destination unit (e.g., BBU 320) if no processing/compression is considered, $B_{no\text{-}comp}$, and the bits (throughput) required to achieve the same EVM if some processing compression is utilized, $B_{method}$, i.e., $$CR = \frac{B_{no\text{-}comp}}{B_{method}}.$$

On the other hand, in the chained MIMO architecture the frequency domain functionalities are moved from the BBU or CU 320 respectively to the RRUs 310_1, 310_2, . . . , 310_N (e.g., the FFT and CP removal for OFDM) such that the processing in done in the frequency domain. Additional BBU functionalities can also be moved to the RRUs 310_1, 310_2, . . . , 310_N such as the baseband beamforming processing, which can be done in a centralized manner or in a distributed manner.

In the centralized beamforming, the received signal at each RRU 310_$n$ is forwarded to the BBU 320, which applies a centralized beamforming filter on the available received signals to reconstruct the symbols, transmitted by the user communication devices 350, at the BBU 320.

In the distributed beamforming, local beamforming is applied at the RRUs 310_$n$, and the resulting processed signal is forwarded to the BBU 320 to reconstruct the symbols transmitted by the user communication devices 350.

In distributed beamforming, the design of the receive beamforming filters requires the knowledge of global CSI, which is generally only available at the BBU 320. If the delay constraints are not stringent, this design can be done in a centralized manner at the BBU 320 and forwarded to the RRUs 310_1, 310_2, . . . , 310_N. This results in a large delay in the system and requires of certain feedback capabilities between the RRUs 310_1, 310_2, . . . , 310_N and the BBU 320. However, if stringent delays are present in the system, only centralized beamforming can be applied, since it has essentially no delay as it does not require CSI at the RRUs 310_1, 310_2, . . . , 310_N. This has been denoted above by the case of no CSI, while for the distributed case, since the BBU 320 forwards all the required CSI (or the required beamforming filters) to the RRUs 310_1, 310_2, . . . , 310_N, has been denoted above by the case of presence of a global CSI.

Thus, the present disclosure provides an efficient I/Q compression solution for a C-MIMO system consisting on an addition of a decompression entity 501 followed by a joint compression entity 502 at each RRU 310_1, 310_2, . . . , 310_$n$, 310_N to significantly decrease the FH throughput requirements while guaranteeing a low distortion (EVM) between the signals transmitted by the user communication devices 350 and their reconstruction at the BBU 320. The processing at decompression and joint compression entities 501, 502 are appropriately chosen depending on the CSI and delay requirements of the system.

For the communication purposes, different known communication standards and/or protocols can be used according to the present disclosure.

Further, the present disclosure is implementable in a modular way. Thus, the embodiments described above may be combined with each other in several ways.

Thus, as shown above, the present disclosure relates to reception of radio frequency (RF) signals from one or more user communication devices at N RF signal receiving devices, wherein N is a positive integer, and to processing of the received RF signals by the one or more RF signal receiving devices. A RF signal receiving device decompresses compressed output signals received from one or more RF signal receiving devices of the N RF signal receiving devices and generates a compressed output signal by executing a signal compression with regard to the decompressed signals and with regard to a RF signal received by the RF signal receiving device. Additionally, the present disclosure is directed to a further processing of output signals of a RF signal receiving device of the N RF signal receiving devices at a signal processing device.

The disclosure has been described in conjunction with various embodiments herein. However, other variations to the enclosed embodiments can be understood and effected by those skilled in the art and practicing the claimed disclosure, from a study of the drawings, the disclosure and the appended claims. In the claims, the word "comprising" does not exclude other elements or actions, and the indefinite article "a" or "an" does not exclude a plurality. The mere fact that certain measures are recited in mutually different dependent claims does not indicate that a combination of these measures cannot be used to advantage.

What is claimed is:

1. A radio frequency (RF) signal receiving device configured to receive RF signals from K user communication devices, wherein K is a positive integer, and wherein said RF signal receiving device comprises:
a decompression entity configured to generate n−1 decompressed signals by decompressing n−1 compressed output signals, received from n−1 further RF signal receiving devices of an arrangement of N RF signal receiving devices, wherein the N RF signal receiving devices are coupled in a serial chain and wherein N is a positive integer and wherein n is a positive integer that is less than or equal to N−1;
a compression entity configured to generate a compressed output signal by executing a signal compression with regard to the n−1 decompressed signals and with regard to a RF signal received by the RF signal receiving device.

2. The RF signal receiving device of claim 1, wherein the RF signal receiving device comprises one or more antennas configured to receive the RF signals from the K user communication devices.

3. The RF signal receiving device of claim 1, wherein the compression entity is configured to execute the signal compression by using a vector coding method.

4. The RF signal receiving device of claim 1, further comprising a processing entity configured to execute a signal processing with regard to the n−1 decompressed signals and with regard to the received RF signal before the compression of the n−1 decompressed signals and the received RF signal by the compression entity.

5. The RF signal receiving device of claim 4, wherein:
the signal processing, executed by the processing entity, comprises a generation of an innovation signal by executing an innovation computation with regard to the n−1 decompressed signals and with regard to the received RF signal; and
the compression entity is further configured to: execute the signal compression by compressing the innovation signal, and output the compressed innovation signal as the compressed output signal.

6. The RF signal receiving device of claim 4, wherein:
the signal processing, executed by the processing entity, comprises a generation of an estimation signal of an estimation of a function of N RF signals, received at the N RF signal receiving devices, with regard to the n−1 decompressed signals and with regard to the received RF signal; and
the compression entity is further configured to execute the signal compression by compressing the estimation signal and to output the compressed estimation signal as the compressed output signal.

7. The RF signal receiving device of claim 6, wherein the estimation signal is a distributed beamforming estimation signal and wherein the generation of the estimation signal comprises a generation of the distributed beamforming estimation signal or a partial estimation function of the distributed beamforming estimation as the distributed beamforming estimation signal by executing a beamforming estimation with regard to the n−1 decompressed signals and with regard to the received RF signal.

8. The RF signal receiving device of claim 7, wherein the beamforming estimation is executed with regard to a beamformed received RF signal and wherein any one of the n−1 decompressed signals is a beamformed signal.

9. The RF signal receiving device of claim 7, wherein the RF signal receiving device further comprises a beamforming entity configured to execute a beamforming with regard to the received RF signal.

10. The RF signal receiving device of claim 9, wherein the beamforming is executed by using a distributed beamformer filter.

11. The RF signal receiving device of claim 10, wherein the distributed beamformer filter is determined by the RF signal receiving device or an information on the distributed beamformer filter to be used is received by the RF signal receiving device from a signal processing device.

12. The RF signal receiving device of claim 1, wherein the RF signal receiving device is configured to provide the compressed output signal to at least one further RF signal receiving device of the arrangement of N RF signal receiving devices or to a signal processing device.

13. The RF signal receiving device of claim 12, wherein the RF signal receiving device is configured to provide the compressed output signal to the at least one further RF signal receiving device of the arrangement of N RF signal receiving devices or to the signal processing device via a first fronthaul connection between the RF signal receiving device and the at least one further RF signal receiving device of the arrangement of N RF signal receiving devices or via a second fronthaul connection between the RF signal receiving device and the signal processing device.

14. The RF signal receiving device of claim 1, wherein:
the decompressing of the n−1 compressed output signals is based on one or more of parameters, conditions and characteristics of a first link, via which the n−1 compressed output signals have been received;
the signal compression is executed based on one or more of parameters, conditions and characteristics of a second link, to which the compressed output signal will be output; and
the one or more parameters, conditions and characteristics comprise one or more of a capacity of the respective link, channel state information, CSI, delay requirements, and common public radio interface, CPRI, bandwidth.

15. A method for execution by a radio frequency (RF) signal receiving device, which is configured to receive RF signals from K user communication devices, wherein K is a positive integer, and wherein the method comprises steps of:
- generating n−1 decompressed signals by decompressing n−1 compressed output signals, received from n−1 further RF signal receiving devices of an arrangement of N RF signal receiving devices, wherein the N RF signal receiving devices are coupled in a serial chain and wherein N is a positive integer and wherein n is a positive integer that is less than or equal to N−1;
- generating a compressed output signal by executing a signal compression with regard to the n−1 decompressed signals and with regard to a RF signal received by the RF signal receiving device.

16. A signal processing device, comprising:
- a receiving entity configured to receive a compressed output signal from a radio frequency (RF) signal receiving device of an arrangement of N RF signal receiving devices, wherein each RF signal receiving device of the arrangement of N RF signal receiving devices is a RF signal receiving device comprising a decompression entity and a compression entity, wherein the N RF signal receiving devices are coupled in a serial chain, and wherein N is a positive integer; and
- a signal reconstruction entity configured to execute a signal reconstruction by use of the received compressed output signal.

17. The signal processing device of claim 16, wherein the signal reconstruction results in reconstructed RF signals received at the N RF signal receiving devices of the arrangement of N RF signal receiving devices.

18. The signal processing device of claim 16, wherein the signal reconstruction entity is configured to execute the signal reconstruction by:
- computing a centralized beamforming filter; and
- generating an estimation of RF signals received at the N RF signal receiving devices of the arrangement of N RF signal receiving devices, wherein the estimation is executed by applying the centralized beamforming filter to the received compressed output signal.

19. The signal processing device of claim 16, wherein the signal reconstruction entity is configured to execute the signal reconstruction by:
- decompressing the received compressed output signal; and
- executing the signal reconstruction with regard to the decompressed signal received by the decompressing of the received compressed output signal.

* * * * *